United States Patent
Minami et al.

(10) Patent No.: US 10,424,780 B2
(45) Date of Patent: Sep. 24, 2019

(54) NEGATIVE ELECTRODE ACTIVE MATERIAL FOR NONAQUEOUS ELECTROLYTE SECONDARY BATTERIES AND NONAQUEOUS ELECTROLYTE SECONDARY BATTERY CONTAINING NEGATIVE ELECTRODE ACTIVE MATERIAL

(71) Applicant: SANYO Electric Co., Ltd., Daito-shi, Osaka (JP)

(72) Inventors: Hiroshi Minami, Hyogo (JP); Tatsuya Akira, Hyogo (JP); Taizou Sunano, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 670 days.

(21) Appl. No.: 14/911,783

(22) PCT Filed: Sep. 11, 2014

(86) PCT No.: PCT/JP2014/004693
§ 371 (c)(1),
(2) Date: Feb. 12, 2016

(87) PCT Pub. No.: WO2015/045316
PCT Pub. Date: Apr. 2, 2015

(65) Prior Publication Data
US 2016/0190553 A1    Jun. 30, 2016

(30) Foreign Application Priority Data

Sep. 24, 2013 (JP) .................................. 2013-196427

(51) Int. Cl.
*H01M 4/36* (2006.01)
*H01M 4/48* (2010.01)
(Continued)

(52) U.S. Cl.
CPC ............. *H01M 4/364* (2013.01); *H01M 4/48* (2013.01); *H01M 4/525* (2013.01);
(Continued)

(58) Field of Classification Search
None
See application file for complete search history.

(56) References Cited

U.S. PATENT DOCUMENTS

2003/0053945 A1    3/2003    Fukuoka et al.
2010/0055563 A1    3/2010    Nakanishi et al.
(Continued)

FOREIGN PATENT DOCUMENTS

JP    2003-160328 A    6/2003
JP    2010-55775 A     3/2010
(Continued)

OTHER PUBLICATIONS

International Search Report dated Nov. 18, 2014, issued in counterpart International Application No. PCT/JP2014/004693 (2 pages).
(Continued)

*Primary Examiner* — Rena Dye Cronin
(74) *Attorney, Agent, or Firm* — Westerman, Hattori, Daniels & Adrian, LLP

(57) ABSTRACT

In a nonaqueous electrolyte secondary battery containing $SiO_X$ as a negative electrode active material, initial charge/discharge efficiency and cycle characteristics are increased. A negative electrode active material for nonaqueous electrolyte secondary batteries is provided. The negative electrode active material contains particles comprising of SiOx ($0.8 \leq X \leq 1.2$). The particles have cracks therein. $SiO_X$ preferably contains a lithium silicate phase, a Si-M compound, or an oxide of M (M is at least one selected from the group consisting of Al, Ti, Fe, and Ni). The cracks preferably extend radially from inner portions of the particles.

7 Claims, 1 Drawing Sheet

(51) Int. Cl.
*H01M 10/052* (2010.01)
*H01M 4/02* (2006.01)
*H01M 4/525* (2010.01)
*H01M 4/58* (2010.01)

(52) U.S. Cl.
CPC ....... *H01M 4/5825* (2013.01); *H01M 10/052* (2013.01); *H01M 2004/027* (2013.01)

(56) References Cited

U.S. PATENT DOCUMENTS

| | | | |
|---|---|---|---|
| 2011/0244328 A1 | 10/2011 | Iriyama et al. | |
| 2011/0311875 A1 | 12/2011 | Lee et al. | |
| 2012/0258361 A1* | 10/2012 | Joo | H01M 4/366 429/218.1 |
| 2012/0321962 A1 | 12/2012 | Kajita et al. | |
| 2013/0136988 A1* | 5/2013 | Tanaka | H01M 4/133 429/220 |
| 2013/0230775 A1 | 9/2013 | Endo | |
| 2013/0280612 A1 | 10/2013 | Lee et al. | |
| 2014/0227562 A1* | 8/2014 | Kamizori | H01M 10/052 429/7 |
| 2015/0072240 A1* | 3/2015 | Yoo | H01M 4/386 429/231.8 |
| 2016/0204431 A1* | 7/2016 | Sawa | H01M 4/134 429/218.1 |

FOREIGN PATENT DOCUMENTS

| | | |
|---|---|---|
| JP | 2011-233245 A | 11/2011 |
| JP | 2012-33311 A | 2/2012 |
| JP | 2012-509564 A | 4/2012 |
| JP | 2013-182783 A | 9/2013 |
| JP | 2013-225470 A | 10/2013 |
| WO | 2010071166 A1 | 6/2010 |
| WO | 2011-102453 A1 | 8/2011 |

OTHER PUBLICATIONS

Lee et al., "Chemical-Assisted Thermal Disproportionation of Porous Silicon Monoxide into Silicon-Based Multicomponent Systems", Angewandte Chemie International Edition, 2012, pp. 2767-2771, vol. 51, Issue 11, cited in the ISR.

Office Action dated Aug. 22, 2017, issued in counterpart Japanese application No. 2015-538883. (7 pages).

Office Action dated Dec. 12, 2017, issued in counterpart Japanese Application No. 2015-538883, with English machine translation. (6 pages).

* cited by examiner

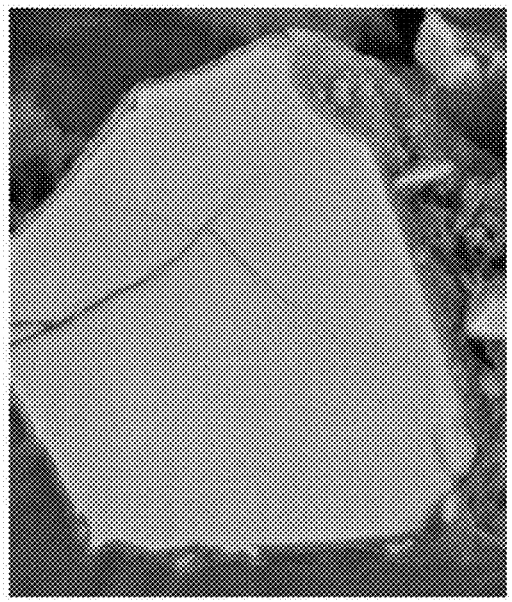

NEGATIVE ELECTRODE ACTIVE MATERIAL FOR NONAQUEOUS ELECTROLYTE SECONDARY BATTERIES AND NONAQUEOUS ELECTROLYTE SECONDARY BATTERY CONTAINING NEGATIVE ELECTRODE ACTIVE MATERIAL

TECHNICAL FIELD

The present invention relates to a negative electrode active material for nonaqueous electrolyte secondary batteries and a nonaqueous electrolyte secondary battery containing the negative electrode active material.

BACKGROUND ART

Silicon (Si) and a silicon oxide represented by $SiO_X$ have higher capacity per unit volume as compared to carbon materials such as graphite and therefore are under investigation for applications in negative electrode active materials. In particular, $SiO_X$ is expected to be put into practical use early because $SiO_X$ has a less volume expansion coefficient as compared to Si when $SiO_X$ stores $Li^+$ during charge. For example, Patent Literature 1 proposes a nonaqueous electrolyte secondary battery containing a negative electrode active material prepared by mixing $SiO_X$ with graphite.

CITATION LIST

Patent Literature

PTL 1: Japanese Published Unexamined Patent Application No. 2011-233245

SUMMARY OF INVENTION

Technical Problem

However, there is a problem in that a nonaqueous electrolyte secondary battery containing $SiO_X$ or the like as a negative electrode active material has poorer initial charge/discharge efficiency and a larger reduction in capacity in early cycles as compared to those containing graphite as a negative electrode active material.

Solution to Problem

The main cause of the above problem is that the change in volume of $SiO_X$ or the like during charge and discharge is greater than graphite. The large change in volume of an active material probably causes, for example, the reduction in electrical conductivity of an active material layer to lead to a decrease in initial charge/discharge efficiency or the like.

In order to solve the above problem, a negative electrode active material for nonaqueous electrolyte secondary batteries according to the present invention contains particles comprising of SiOx (0.8≤X≤1.2). The particles have cracks therein.

A nonaqueous electrolyte secondary battery according to the present invention includes a negative electrode containing the negative electrode active material, a positive electrode, a separator placed between the positive electrode and the negative electrode, and a nonaqueous electrolyte.

Advantageous Effects of Invention

According to the present invention, in a nonaqueous electrolyte secondary battery containing $SiO_X$ as a negative electrode active material, initial charge/discharge efficiency and cycle characteristics can be improved.

BRIEF DESCRIPTION OF DRAWINGS

FIG. 1 is a first electron micrograph showing a cross section of a negative electrode active material particle used in an example.

DESCRIPTION OF EMBODIMENTS

Embodiments of the present invention are described below in detail.

In this specification, the term "approximately *" is intended to include completely the same things and those regarded as substantially the same, as described using the term "approximately the same" as an example.

A nonaqueous electrolyte secondary battery according to an embodiment of the present invention includes a positive electrode containing a positive electrode active material, a negative electrode containing a negative electrode active material, a nonaqueous electrolyte containing a nonaqueous solvent, and a separator. As an example of the nonaqueous electrolyte secondary battery, the following structure is cited: a structure in which an electrode assembly prepared by winding the positive electrode, the negative electrode, and the separator placed therebetween and the nonaqueous electrolyte are placed in an enclosure.

[Positive Electrode]

The positive electrode is preferably composed of a positive electrode current collector and a positive electrode active material layer formed on the positive electrode current collector. The positive electrode current collector used is, for example, an electrically conductive thin film, particularly metal or alloy foil which contains aluminium or the like and which is stable within the potential range of the positive electrode or a film which includes a metal surface layer made of aluminium or the like. The positive electrode active material layer preferably contains a conductive agent and a binder in addition to the positive electrode active material.

The positive electrode active material is not particularly limited and is preferably a lithium transition metal oxide. The lithium transition metal oxide may contain a non-transition metal element such as Mg or Al. Examples of the lithium transition metal oxide include lithium cobaltate, olivine-type lithium phosphate typified by lithium iron phosphate, and lithium transition metal oxides such as Ni—Co—Mn, Ni—Mn—Al, and Ni—Co—Al. The positive electrode active material may be used alone or in combination with another positive electrode active material.

The conductive agent used may be a carbon material such as carbon black, acetylene black, or Ketjenblack or a mixture of two or more of carbon black, acetylene black, and Ketjenblack. The binder used may be polytetrafluoroethylene, polyvinylidene fluoride, polyvinyl acetate, polyacrylonitrile, polyvinyl alcohol, or a mixture of two or more of polytetrafluoroethylene, polyvinylidene fluoride, polyvinyl acetate, polyacrylonitrile, and polyvinyl alcohol.

[Negative Electrode]

The negative electrode preferably includes a negative electrode current collector and a negative electrode active material layer formed on the negative electrode current collector. The negative electrode current collector used is, for example, an electrically conductive thin film, particularly metal or alloy foil which contains copper or the like and which is stable within the potential range of the negative electrode or a film which includes a metal surface layer made of copper or the like. The negative electrode active material layer preferably contains a binder in addition to the negative electrode active material. The binder used may be polytetrafluoroethylene or the like as is the case with the positive electrode and is preferably styrene-butadiene rubber (SBR), polyimide, or the like. The binder may be used in combination with a thickening agent such as carboxymethylcellulose.

The negative electrode active material contains particles comprising of SiOx ($0.8 \leq X \leq 1.2$). The particles have cracks therein. Since the particles have the cracks therein, the change in volume of $SiO_X$ particles can be reduced during charge and discharge. Therefore, in the nonaqueous electrolyte secondary battery, which contains the negative electrode active material, initial charge/discharge efficiency and cycle characteristics are significantly improved.

The cracks preferably extend radially from inner portions of the $SiO_X$ particles. This is because cracks originating from inner portions of particles are more effective in reducing a change in volume than cracks originating from the surfaces of particles. When the cracks extend radially from the inner portions of the $SiO_X$ particles, at least one portion of each crack preferably reaches the periphery of a corresponding one of the particles. When the cracks reach the peripheries of the $SiO_X$ particles, the stress induced in the particles by a change in volume during charge or discharge can be released outside the particles.

In a cross section of each $SiO_X$ particle, the cracks preferably have a maximum width 0.2 times or less the average primary particle size ($D_{50}$) of the $SiO_X$ particles. When the maximum width of the cracks is greater than 0.2 times the size of the $SiO_X$ particles, some of the particles may possibly be fragmented or the particles may possibly be fragmented by the change in volume of $SiO_X$ during charge or discharge. In the case where the $SiO_X$ particles are fragmented, the particles have increased surface area and therefore a side reaction of an electrolyte solution is promoted; hence, initial charge/discharge efficiency and cycle characteristics are reduced. The minimum width of the cracks is preferably 0.001 times or more the particle size, more preferably 0.005 times or more, and further more preferably 0.01 times or more. Even cracks with a width less than the above crack width act as nuclei during charge or discharge to form cracks with a width within the above range in some cases.

A method for forming the cracks in the $SiO_X$ particles is as follows: for example, an aqueous solution of a lithium compound is mixed with the $SiO_X$ particles, the lithium compound is deposited on the $SiO_X$ particles by evaporating water, and the $SiO_X$ particles having the lithium compound deposited thereon are fired at 500° C. to 1,000° C. The fired $SiO_X$ particles have the cracks formed therein and contain a lithium silicate phase. According to the above method, the lithium compound is homogeneously deposited on the $SiO_X$ particles and therefore reaction occurs uniformly over the $SiO_X$ particles; hence, the formation of the cracks is readily controlled and the cracks are likely to be radially formed in the $SiO_X$ particles. The aqueous solution of the lithium compound is alkaline. Therefore, if the $SiO_X$ particles are directly provided in the aqueous solution, then Si in the $SiO_X$ particles is eluted and therefore cavities are formed, thereby causing a reduction in energy density. Therefore, the aqueous solution is preferably neutralized with acid such as HCl. Another method for forming the $SiO_X$ particles having the cracks therein is as follows: for example, the $SiO_X$ particles are mixed with a compound containing a metal element M (M is at least one selected from the group consisting of Al, Ti, Fe, and Ni), followed by firing. The fired $SiO_X$ particles have the cracks formed therein and comprise a Si-M compound or an oxide of the metal element M.

The $SiO_X$ particles are preferably surface-coated with carbon. $SiO_X$ has low electronic conductivity. Therefore, surface-coating the $SiO_X$ particles with carbon allows the $SiO_X$ particles to have increased electronic conductivity. In the case of coating the $SiO_X$ particles with carbon, in order to increase the reaction homogeneity of $SiO_X$, $SiO_X$ is preferably uniformly surface-coated. A carbon coating preferably has a thickness of 1 nm to 200 nm. When the thickness of the carbon coating is less than 1 nm, the electrical conductivity is low and it is difficult to uniformly coat the $SiO_X$ particles. However, when the thickness thereof is greater than 200 nm, the carbon coating inhibits the diffusion of lithium and therefore lithium does not sufficiently reach $SiO_X$, thereby causing a significant reduction in capacity. Furthermore, in the case of coating the $SiO_X$ particles with carbon, carbon preferably accounts for 10% by mass or less of $SiO_X$.

About 50% to 100% of the surface of each $SiO_X$ particle is preferably coated with carbon and 100% of the surface of the $SiO_X$ particle is more preferably coated with carbon. In the present invention, the expression "the surface of $SiO_X$ is coated with carbon" means that the surface of each $SiO_X$ particle is covered with a carbon coating with a thickness of at least 1 mm. In the present invention, the expression "approximately 100% of the surface of each $SiO_X$ particle is coated with carbon" means that approximately 100% of the surface of each $SiO_X$ particle is covered with a carbon coating with a thickness of at least 1 mm.

When the $SiO_X$ particles contain the lithium silicate phase, the lithium silicate phase preferably accounts for 0.5 mole percent to 25 mole percent of the amount of $SiO_X$. When the lithium silicate phase accounts for less than 0.5 mole percent, the effect of improving initial charge/discharge efficiency is small. However, when the lithium silicate phase accounts for greater than 25 mole percent, the amount of reversibly reacting Si is small and therefore charge/discharge capacity is low. As the lithium silicate phase accounts for a larger percentage of the amount of $SiO_X$, the maximum width of the cracks is larger. Therefore, the lithium silicate phase more preferably accounts for 1.0 mole percent to 15 mole percent of the amount of $SiO_X$.

When the $SiO_X$ particles comprise the Si-M compound or the oxide of the metal element M (M is at least one selected from the group consisting of Al, Ti, Fe, and Ni), M preferably accounts for 0.05% by mass to 15% by mass of the amount of the $SiO_X$ particles. When M accounts for less than 0.05% by mass, very few cracks are formed in the particles and therefore the effect of improving initial charge/discharge efficiency is small. However, when M accounts for greater than 15% by mass, the energy density of a battery containing the $SiO_X$ particles is low.

The average primary particle size of the $SiO_X$ particles is preferably 1 μm to 15 μm. When the average primary particle size of $SiO_X$ is less than 1 μm, the surface area of the particles is excessively large; hence, the amount of the particles reacting with an electrolyte solution is large and the capacity may possibly decrease. When the average primary particle size thereof is less than 1 μm, the expansion and contraction of $SiO_X$ are small and have a small influence on a negative electrode mix layer. Therefore, even if no cracks are formed in $SiO_X$, separation is unlikely to occur between the negative electrode mix layer and the negative electrode current collector and cycle characteristics are not significantly reduced. However, when the average primary particle size of $SiO_X$ is greater than 15 μm, the lithium silicate phase, the Si-M compound, or the oxide of M is unlikely to be formed and therefore the cracks are unlikely to be formed. The average primary particle size of $SiO_X$ is more preferably 4 μm to 10 μm. Incidentally, the average primary particle size ($D_{50}$) of $SiO_X$ corresponds to the cumulative volume 50% diameter in the particle size distribution determined by a laser diffraction/scattering method.

When the negative electrode active material used is a mixture of $SiO_X$ and a carbon material such as graphite or hard carbon, the mass ratio of $SiO_X$ to the carbon material preferably ranges from 1:99 to 20:80. When the mass ratio thereof is within this range, high capacity and enhanced cycle characteristics are likely to be both achieved. However, when $SiO_X$ accounts for less than 1% by mass of the negative electrode active material, the merit of increasing the capacity by adding a metal material alloying with lithium or an oxide of the metal material is small.

[Nonaqueous Electrolyte]

Examples of an electrolyte salt in the nonaqueous electrolyte that can be used include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}O_{10}$, lithium lower aliphatic carboxylates, LiCl, LiBr, LiI, chloroborane lithium, borates, and imide salts. In particular, $LiPF_6$ is preferably used from the viewpoint of ionic conductivity and electrochemical stability. The electrolyte salt may be used alone or in combination with another electrolyte salt. In 1 L of the nonaqueous electrolyte, 0.8 mol to 1.5 mol of the electrolyte salt is preferably contained.

Examples of a solvent in the nonaqueous electrolyte include cyclic carbonate esters, linear carbonate esters, and cyclic carboxylic esters. The cyclic carbonate esters are polypropylene carbonate (PC), ethylene carbonate (EC), and the like. The linear carbonate esters diethyl carbonate (DEC), ethyl methyl carbonate (EMC), dimethyl carbonate (DMC), and the like. The cyclic carboxylic esters are γ-butyrolactone (GBL), γ-valerolactone (GVL), and the like. The nonaqueous solvent may be used alone or in combination with another nonaqueous solvent.

[Separator]

The separator used is a porous sheet having ion permeability and insulating properties. Examples of the porous sheet include microporous thin-films, woven fabric, and nonwoven fabric. The separator is preferably made of a polyolefin such as polyethylene or a polypropylene.

When the positive electrode active material contains lithium and an oxide containing a metal element R and the metal element R includes at least one selected from the group consisting of cobalt and nickel, the ratio $x/R_c$ is preferably greater than 1.01 and more preferably greater than 1.03, where x is the sum of the amount of lithium contained in the positive electrode and the amount of lithium contained in the negative electrode and $R_c$ is the amount of the metal element R contained in the oxide. When the ratio $x/R_c$ is within the above range, the rate of lithium ions supplied to the battery is very high. This is advantageous in compensating for irreversible capacity.

When the negative electrode active material is a mixture of $SiO_X$ containing the lithium silicate phase and a carbonaceous active material, the ratio $x/R_c$, varies depending on the percentage of $SiO_X$ with respect to the amount of the negative electrode active material. The ratio $x/R_c$ is varied by, for example, attaching metallic lithium foil to the negative electrode. The ratio $x/R_c$ can be calculated in such a manner that the amount x of contained in the positive and negative electrodes and the amount $R_c$ of the metal element R contained in the positive electrode active material are determined and the amount x is divided by the amount $R_c$ of the metal element R.

The amount x of lithium and the amount $R_c$ of the metal element R can be determined as described below.

First, the battery is completely discharged and is then disassembled, followed by removing the nonaqueous electrolyte. The inside of the battery is cleaned with a solvent such as dimethyl carbonate. Next, a predetermined mass is taken from each of the positive electrode and the negative electrode and the amount of lithium contained in each of the positive electrode and the negative electrode is determined by ICP analysis, whereby the amount x, in moles, of lithium is determined. Furthermore, as is the case with the amount of lithium in the positive electrode, the amount $R_c$ of the metal element R contained in the positive electrode is determined by ICP analysis.

EXAMPLES

The present invention is further described below with reference to examples. The present invention is not limited to the examples.

First Experiment Example

Example 1

[Preparation of Negative Electrode]

$SiO_X$ (X=0.93, an average primary particle size of 5.0 μm) surface-coated with carbon was prepared. A CVD process was used for coating. Carbon accounted for 10% by mass of $SiO_X$. The carbon coverage of the surface of $SiO_X$ was 100%. The carbon coverage of the $SiO_X$ surface was determined by a method below. A cross section of each $SiO_X$ particle was exposed using an ion milling system (ex. IM4000) manufactured by Hitachi High-Technologies Corporation. The particle cross section was observed with a SEM and a backscattered electron image. The interface between a carbon coating layer and $SiO_X$ in the cross section was identified from the backscattered electron image. The percentage of carbon coatings, having a thickness of 1 nm or more, present on the surface of each $SiO_X$ particle was calculated from the ratio of the sum of the lengths of the interfaces between the carbon coatings having a thickness of 1 nm or more and $SiO_X$ to the perimeter of $SiO_X$ in the particle cross section. The average of the percentages of the carbon coatings, having a thickness of 1 nm or more, present on the surfaces of 30 of the $SiO_X$ particles was calculated as the carbon coverage.

In 500 g of water, 0.2 moles of LiOH was dissolved, followed by adding HCl dropwise, whereby an aqueous solution adjusted to a pH of 8.0 was prepared. To the aqueous solution, 1 mole of the $SiO_X$ was added, followed by mixing (LiOH accounted for 20 mole percent of $SiO_X$). The mixed solution was dried at 100° C., whereby LiOH was attached to the surface of $SiO_X$. After $SiO_X$ was heat-treated at 800° C. for 10 hours in an Ar atmosphere, $SiO_X$ was washed with water. A cross-sectional SEM image of one of the $SiO_X$ particles that were heat-treated and were water-washed is shown in FIG. 1. As is clear from the SEM image, cracks extend radially from an inner portion of this $SiO_X$ particle. A crack having the maximum width reaches the periphery of this particle as shown in FIG. 1. The maximum width of the cracks was 0.2 μm and the ratio of the maximum width of the cracks to the average primary particle size ($D_{50}$) of the $SiO_X$ particles was 0.04.

The maximum width of the cracks was measured by a method below. A cross section of each $SiO_X$ particle was exposed and was observed with a SEM and a backscattered electron image. Whether cracks were present and the width of the cracks were determined from the backscattered electron image. The maximum of cracks in 30 of the particles was defined as the maximum width of the cracks.

$SiO_X$ that was heat-treated and was water-washed was analyzed by XRD (a radiation source was Cu Kα), so that a peak corresponding to $Li_2SiO_3$, that is, lithium silicate, was observed. The number of moles (hereinafter referred to as the percentage of a lithium silicate phase in $SiO_X$ in some cases) of a lithium silicate phase with respect to the number of moles of $SiO_X$ was 5 mole percent.

$SiO_X$ and PAN (polyacrylonitrile) that is a binder were mixed together at a mass ratio of 95:5, followed by adding NMP (N-methyl-2-pyrrolidone) serving as a dilution solvent. The mixture was stirred using a mixer (ROBOMIX manufactured by PRIMIX Corporation), whereby negative electrode mix slurry was prepared. The negative electrode mix slurry was applied to a surface of copper foil such that the mass per square meter of a negative electrode mix layer was 25 g/m². The copper foil was dried at 105° C. in air and was rolled, whereby a negative electrode was prepared. The packing density of the negative electrode mix layer was 1.50 g/ml.

[Preparation of Nonaqueous Electrolyte Solution]

To a solvent mixture prepared by mixing ethylene carbonate (EC) and diethyl carbonate (DC) at a volume ratio of 3:7, 1.0 mole per liter of lithium hexafluorophosphate ($LiPF_6$) was added, whereby a nonaqueous electrolyte solution was prepared.

[Assembly of Battery]

An electrode assembly was prepared in an inert atmosphere using the negative electrode equipped with a Ni tab attached to the periphery thereof, metallic lithium foil, and a polyethylene separator placed between the negative electrode and the metallic lithium foil. The electrode assembly was provided in a battery enclosure composed of an aluminium laminate. Furthermore, the nonaqueous electrolyte solution was poured into the battery enclosure. Thereafter, the battery enclosure was sealed, whereby Battery A1 was prepared.

Example 2

Battery A2 was prepared in substantially the same manner as that described in Example 1 except that $Li_2CO_3$ was used instead of LiOH ($Li_2CO_3$ accounted for 10 mole percent of $SiO_X$). Cracks were present in $SiO_X$ particles that were heat-treated and were water-washed. The cracks extended radially from inner portions of the $SiO_X$ particles to reach the peripheries of the particles. The cracks had a maximum width of 0.3 μm. The ratio of the maximum width of the cracks to the average primary particle size ($D_{50}$) of the $SiO_X$ particles was 0.06. $SiO_X$ that was heat-treated and was water-washed was analyzed by XRD, so that peaks corresponding to $Li_4SiO_4$ and $Li_2SiO_3$, that is, lithium silicates, were observed. The percentage of a lithium silicate phase in $SiO_X$ was 5 mole percent.

Example 3

Battery A3 was prepared in substantially the same manner as that described in Example 1 except that an Al powder (a particle size of 5 μm) was used instead of LiOH, Al accounted for 1% by mass of $SiO_X$, and Al was attached to the surface of $SiO_X$ by mixing in a powder state. Cracks were present in $SiO_X$ particles that were heat-treated and were water-washed. The maximum width of the cracks was 0.1 μm. The ratio of the maximum width of the cracks to the average primary particle size ($D_{50}$) of the $SiO_X$ particles was 0.02. The $SiO_X$ particles that were heat-treated and were water-washed were analyzed by XRD, so that a peak corresponding to $Al_2O_3$ was observed.

Comparative Example 1

Battery Z was prepared in substantially the same manner as that described in Example 1 except that no LiOH was mixed with $SiO_X$ and no heat treatment was performed (that is, untreated $SiO_X$ was used as a negative electrode active material).

(Experiment)

Batteries A1 to A3 and Z were charged and discharged under conditions below, followed by investigating the initial charge/discharge efficiency given by Equation (1) and the tenth-cycle capacity retention given by Equation (2). Results are shown in Table 1.

[Charge/Discharge Conditions]

After constant-current charge was performed at a current of 0.2 lt (4 mA) until the voltage reached 0 V, constant-current charge was performed at a current of 0.05 lt (1 mA) until the voltage reached 0 V. Next, after a rest was taken for 10 minutes, constant-current discharge was performed at a current of 0.2 lt (4 mA) until the voltage reached 1.0 V.

[Equation for Calculating Initial Charge/Discharge Efficiency]

Initial charge/discharge efficiency (%)=(first-cycle discharge capacity/first-cycle charge capacity)×100    (1)

[Equation for Calculating Tenth-Cycle Capacity Retention]

Tenth-cycle capacity retention (%)=(tenth-cycle discharge capacity/first-cycle discharge capacity)×100    (2)

TABLE 1

| Battery | Whether cracks are present | Maximum crack width/ pore size | Initial charge/discharge efficiency (%) | Tenth-cycle capacity retention (%) |
|---|---|---|---|---|
| A1 | Present | 0.04 | 74 | 52 |
| A2 | Present | 0.06 | 75 | 55 |
| A3 | Present | 0.02 | 71 | 42 |
| Z | Not present | — | 67 | 7 |

Batteries A1 to A3, which contain the $SiO_X$ particles having the cracks formed therein, have enhanced initial charge/discharge efficiency and cycle characteristics as compared to Battery Z, which contains $SiO_X$ particles having no cracks. Forming the cracks in the $SiO_X$ particles before charge or discharge reduces the volume expansion of the particles during charge or discharge; hence, the separation of a negative electrode mix layer and the reduction in electrical conductivity between negative electrode particles can be suppressed.

Second Experiment Example

Example 4

Battery A4 was prepared in substantially the same manner as that described in Example 1 except that the amount of added LiOH was 0.05 moles. Cracks were present in SiO$_X$ particles that were heat-treated and were water-washed. The cracks extended radially from inner portions of the SiO$_X$ particles and did not reach the peripheries of the particles. The maximum width of the cracks was 0.05 µm. The ratio of the maximum width of the cracks to the average primary particle size (D$_{50}$) of the SiO$_X$ particles was 0.01. SiO$_X$ that was heat-treated and was water-washed was analyzed by XRD, so that a peak corresponding to Li$_2$SiO$_3$, that is, lithium silicate, was observed. The percentage of a lithium silicate phase in SiO$_X$ was 1 mole percent.

Example 5

Battery A5 was prepared in substantially the same manner as that described in Example 1 except that the amount of added LiOH was 1.0 mole. Cracks were present in SiO$_X$ particles that were heat-treated and were water-washed. The cracks extended radially from inner portions of the SiO$_X$ particles and reached the peripheries of the particles. The maximum width of the cracks was 1.0 µm. The ratio of the maximum width of the cracks to the average primary particle size (D$_{50}$) of the SiO$_X$ particles was 0.2. SiO$_X$ that was heat-treated and was water-washed was analyzed by XRD, so that peaks corresponding to Li$_4$SiO$_4$ and Li$_2$SiO$_3$, that is, lithium silicates, were observed. The percentage of a lithium silicate phase in SiO$_X$ was 1 mole percent. The percentage of the lithium silicate phase in heat-treated SiO$_X$ was 8 mole percent.

Example 6

Battery A6 was prepared in substantially the same manner as that described in Example 1 except that the heat treatment temperature of SiO$_X$ and LiOH was 900° C. Cracks were present in SiO$_X$ particles that were heat-treated and were water-washed. The cracks extended radially from inner portions of the SiO$_X$ particles. It was observed that some of the particles were fragmented because of the cracks. The maximum width of the cracks not associated with fragmentation was 1.2 µm. The ratio of the maximum width of the cracks to the average primary particle size (D$_{50}$) of the SiO$_X$ particles was 0.24. SiO$_X$ that was heat-treated and was water-washed was analyzed by XRD, so that peaks corresponding to Li$_4$SiO$_4$ and Li$_2$SiO$_3$, that is, lithium silicates, were observed. The percentage of a lithium silicate phase in SiO$_X$ was 20 mole percent.

Example 7

Battery A7 was prepared in substantially the same manner as that described in Example 1 except that SiO$_X$ with an average primary particle size of 10.0 µm was used. Cracks were present in SiO$_X$ particles that were heat-treated and were water-washed. The cracks extended radially from inner portions of the SiO$_X$ particles and reached the peripheries of the particles. The maximum width of the cracks was 0.2 µm. The ratio of the maximum width of the cracks to the average primary particle size (D$_{50}$) of the SiO$_X$ particles was 0.02. SiO$_X$ that was heat-treated and was water-washed was analyzed by XRD, so that peaks corresponding to Li$_4$SiO$_4$ and Li$_2$SiO$_3$, that is, lithium silicates, were observed. The percentage of a lithium silicate phase in SiO$_X$ was 1 mole percent. The percentage of the lithium silicate phase in heat-treated SiO$_X$ was 3 mole percent.

(Experiment)

Batteries A4 to A7 were charged and discharged under the same conditions as the conditions used in the experiment described in the first example, followed by investigating the initial charge/discharge efficiency given by Equation (1) and the tenth-cycle capacity retention given by Equation (2). Results are shown in Table 2. Results for Battery A2 are also shown in Table 2.

TABLE 2

| Battery | Size of SiO$_X$ particles (µm) | Percentage of Li silicate (mole percent) | Whether cracks are present | Maximum crack width/ pore size | Initial charge/discharge efficiency (%) | Tenth-cycle capacity retention (%) |
|---|---|---|---|---|---|---|
| A4 | 5 | 1 | Present | 0.01 | 69 | 36 |
| A7 | 10 | 3 | Present | 0.02 | 72 | 48 |
| A1 | 5 | 5 | Present | 0.04 | 74 | 52 |
| A5 | 5 | 8 | Present | 0.2 | 72 | 42 |
| A6 | 5 | 18 | Present | 0.24 | 69 | 32 |

As the maximum width of the cracks formed in the SiO$_X$ particles is larger than the size of the particles, the initial charge/discharge efficiency and cycle characteristics are higher. However, when the ratio of the maximum width of the cracks to the particle size is greater than 0.2, some of the particles are fragmented and the rate of side reactions is increased; hence, the initial charge/discharge efficiency and cycle characteristics tend to be reduced.

Third Experiment Example

Example 8

[Preparation of Positive Electrode]

Lithium cobaltate serving as a positive electrode active material, acetylene black (HS100 produced by Denki Kagaku Kogyo Kabushiki Kaisha) serving as a conductive agent, and polyvinylidene fluoride (PVdF) serving as a binder were weighed and were mixed together at a mass ratio of 95.0:2.5:2.5, followed by adding N-methyl-2-pyrrolidone (NMP) serving as a dispersion medium. The mixture was stirred using a mixer (T.K. HIVIS MIX manufactured by PRIMIX Corporation), whereby positive electrode slurry was prepared. Next, the positive electrode slurry was applied to both surfaces of a positive electrode current collector composed of aluminium foil and was then dried. The positive electrode current collector was rolled using a rolling roller, whereby a negative electrode including positive electrode mix layers formed on both surfaces of the positive electrode current collector was prepared. The packing density of the positive electrode mix layers was 3.60 g/ml.

[Preparation of Negative Electrode]

A negative electrode active material used was a mixture of graphite and $SiO_X$, used Example 1, having cracks therein. Heat-treated $SiO_X$ accounted for 5% by mass of the amount of the negative electrode active material. The negative electrode active material, carboxymethylcellulose (CMC, #1380 produced by Daicel FineChem, Ltd., a degree of etherification of 1.0 to 1.5) serving as a thickening agent, and SBR (styrene-butadiene rubber) serving as a binder were mixed together at a mass ratio of 97.5:1.0:1.5, followed by adding water serving as a dilution solvent. This mixture was stirred using a mixer (T.K. HIVIS MIX manufactured by PRIMIX Corporation), whereby negative electrode slurry was prepared. Next, the negative electrode slurry was uniformly applied to both surfaces of a negative electrode current collector composed of copper foil such that such that the mass per square meter of negative electrode mix layers was 190 g. Next, the negative electrode current collector was dried at 105° C. and was then rolled using a rolling roller, whereby a negative electrode including negative electrode mix layers formed on both surfaces of the negative electrode current collector was prepared. The packing density of the negative electrode mix layers was 1.60 g/ml.

[Preparation of Battery]

The positive electrode and the negative electrode were arranged opposite to each other with a separator, composed of a polyethylene microporous membrane, therebetween. Next, a positive electrode tab and a negative electrode tab were attached to the positive electrode and the negative electrode, respectively, so as to be located in the outermost region of each electrode. Thereafter, the positive electrode, the negative electrode, and the separator were spirally wound, whereby an electrode assembly was prepared. Next, the electrode assembly was placed into a battery enclosure composed of an aluminium laminate and was then vacuum-dried at 105° C. for 2 hours. Thereafter, the same nonaqueous electrolyte solution as the nonaqueous electrolyte solution described in Example 1 of the first example was poured into the battery enclosure. Furthermore, an opening of the battery enclosure was sealed, whereby a nonaqueous electrolyte secondary battery E1 was prepared. The design capacity of the nonaqueous electrolyte secondary battery is 800 mAh.

Example 9

Battery E2 was prepared in substantially the same manner as that described in Example 8 except that in the preparation of a negative electrode, heat-treated $SiO_X$ accounted for 10% by mass of the amount of a negative electrode active material.

Comparative Examples 2 and 3

Each of Batteries Y1 and Y2 was prepared in substantially the same manner as that described in a corresponding one of Examples 8 and 9 except that untreated $SiO_X$ ($SiO_X$ having no cracks therein) was used.

(Experiment)

Batteries E1, E2, Y1, and Y2 were charged and discharged under conditions below, followed by investigating the initial charge/discharge efficiency given by Equation (1) and cycle life. Results are shown in Table 3. The number of cycles when the discharge capacity reached 80% of the first-cycle discharge capacity was defined as the cycle life. The cycle life of each battery is expressed as an index where the cycle life of Battery Y1 is 100.

Furthermore, rates of increase in initial charge/discharge efficiency and cycle life are those obtained by comparing batteries having the same $SiO_X$ mixing ratio. For example, rates of increase for Battery E1 are relative to those for Battery Y1.

[Charge/Discharge Conditions]

After constant-current charge was performed at a current of 1.0 lt (800 mA) until the voltage of each battery reached 4.2 V, constant-voltage charge was performed at a voltage of 4.2 V until the current reached 0.05 lt (40 mA). After a rest was taken for 10 minutes, constant-current discharge was performed at a current of 1.0 lt (800 mA) until the battery voltage reached 2.75 V.

[Ratio x/R of Amount x of Lithium in Positive and Negative Electrodes to Amount $R_c$ of Metal Element R Contained in Positive Electrode Active Material]

In each of these batteries, the amount x of lithium contained in the positive and negative electrodes and the amount $R_c$ of the metal element R contained in positive electrode active material were determined as described above, followed by calculating the ratio $x/R_c$. Results are shown in Table 3.

TABLE 3

| Battery | Ratio $x/R_c$ | Percentage of $SiO_X$ (mass percent) | Initial charge/discharge efficiency Efficiency (%) | rate of increase (%) | Cycle characteristics Cycle life | rate of increase (%) |
|---|---|---|---|---|---|---|
| E1 | 1.03 | 5 | 90 | 3.4 | 145 | 45 |
| Y1 | 1.01 |   | 87 |   | 100 |   |
| E2 | 1.05 | 10 | 88 | 4.8 | 106 | 152 |
| Y2 | 1.01 |   | 84 |   | 42 |   |

As is clear from Table 3, Batteries E1 and E2 have increased initial charge/discharge efficiency and cycle characteristics as compared to Batteries Y1 and Y2. Accordingly, it is clear that $SiO_X$ having cracks therein is preferably used as $SiO_X$ even in the case of using a negative electrode active material prepared by mixing $SiO_X$ and graphite.

Furthermore, as the percentage of $SiO_X$ is higher, rates of increase in initial charge/discharge efficiency and cycle characteristics are higher. However, when the percentage of $SiO_X$ is excessively high, the separation of a negative electrode mix layer may possibly be significant. Thus, the percentage of $SiO_X$ is preferably 20% by mass or less. When the percentage of $SiO_X$ is excessively low, the effect of adding $SiO_X$ is not sufficiently exhibited. Thus, the percentage of $SiO_X$ is preferably 1% by mass or more.

The invention claimed is:

1. A negative electrode active material for nonaqueous electrolyte secondary batteries which contains particles comprising $SiO_X$ ($0.8 \leq X \leq 1.2$), wherein the particles have cracks therein,
    wherein the particles comprise in addition to the SiOx an oxide of M wherein M is at least one selected from the group consisting of Al, Ti, Fe, and Ni;
    and M accounts for 0.05% by mass to 15% by mass of the amount of the SiOx particles; and
    wherein the particles have cracks therein after production of the particles before charging and discharging.

2. The negative electrode active material for nonaqueous electrolyte secondary batteries according to claim 1, wherein the cracks extend radially from inner portions of the particles.

3. The negative electrode active material for nonaqueous electrolyte secondary batteries according to claim 2, wherein the peripheries of the particles have the cracks.

4. The negative electrode active material for nonaqueous electrolyte secondary batteries according to claim 1, wherein the maximum width of the cracks is 0.2 times or less the size of the particles.

5. A nonaqueous electrolyte secondary battery comprising:
- a negative electrode containing the negative electrode active material according to claim 1;
- a positive electrode containing a positive electrode active material;
- a separator placed between the positive electrode and the negative electrode; and
- a nonaqueous electrolyte.

6. The nonaqueous electrolyte secondary battery according to claim 5, wherein the positive electrode active material contains lithium and an oxide containing a metal element R, the metal element R is at least one selected from the group consisting of cobalt and nickel, the ratio $x/R_c$ is greater than 1.01, where x is the sum of the amount of lithium contained in the positive electrode and the amount of lithium contained in the negative electrode and $R_c$ is the amount of the metal element R contained in the oxide.

7. The negative electrode active material for nonaqueous electrolyte secondary batteries according to claim 1, wherein an x-ray diffraction measurement of the particles exhibits a peak corresponding to the oxide of M.

* * * * *